US006466589B1

(12) United States Patent
Chou

(10) Patent No.: US 6,466,589 B1
(45) Date of Patent: Oct. 15, 2002

(54) APPARATUS FOR VERIFYING DATA INTEGRITY AND SYNCHRONIZING ATM CELL DATA FORMAT FOR PROCESSING

(76) Inventor: Chin-Shen Chou, 108-42 63$^{rd}$ Rd., Forest Hills, NY (US) 11735

( * ) Notice: Subject to any disclaimer, the term of this patent is extended or adjusted under 35 U.S.C. 154(b) by 0 days.

(21) Appl. No.: 09/174,582

(22) Filed: Oct. 19, 1998

(51) Int. Cl.$^7$ .............................. H04J 3/06; H03K 19/00
(52) U.S. Cl. ........................ 370/518; 370/350; 370/498; 370/503; 370/516; 370/517; 375/355; 375/357; 375/371; 326/93; 326/94
(58) Field of Search ................................. 370/301, 389, 370/395, 395.1, 905, 350, 498, 503, 516, 517, 518; 375/226, 227, 346, 354, 355, 357, 371, 362, 365; 714/1, 798; 326/93, 94

(56) References Cited

U.S. PATENT DOCUMENTS

| | | | | |
|---|---|---|---|---|
| 3,961,136 A | * | 6/1976 | Cohen et al. ................. | 178/67 |
| 4,282,489 A | * | 8/1981 | DeRienzo .................... | 328/206 |
| 4,333,060 A | * | 6/1982 | Mosley, Jr. et al. ......... | 331/1 A |
| 4,700,347 A | | 10/1987 | Rettberg et al. | |
| 5,020,038 A | * | 5/1991 | Swapp et al. ................ | 368/120 |
| 5,045,801 A | * | 9/1991 | Mowery ....................... | 328/72 |
| 5,073,932 A | * | 12/1991 | Yossifor et al. .............. | 380/23 |
| 5,297,164 A | * | 3/1994 | McCabe ...................... | 375/10 |

OTHER PUBLICATIONS

T. Jackson and A. Albiki. Analysis of Metastable Operaton in D Latches. IEEE Transaction on Circuits and Systems, vol. 36, No. 11, Nov. 1989. pp. 1392–1404.*

L. Kim and R. Dutton. Metastability of CMOS Latch/Flip–Flop. IEEE Journal of Solid–State Circuits, vol. 25, No. 4, Aug. 1990. pp. 942–951.*
C. Brown and K. Feher. Measuring Metastability and its Effect on Communication Signal Processing Systems. IEEE Transactions on Instrumentation and Measurement, vol. 46, No. 1, Feb. 1997. pp. 61–64.*
T. Kacprzak. Analysis of Oscillatory Metastable Operation of an RS Flip–Flop. IEEE Journal of Solid–State Circuits, vol. 23, No. 1, Feb. 1988. pp. 260–266.*
Robert R. Cordell, A 45–MBIT/s CMOS VLSI Digital Phase Aligner, IEEE JSSC, vol. 23, No. 2, Apr. 1988.
Dana Woeste et al., Digital–Phase Aligner Macro for Clock Tree Compensation with 70ps Jitter, ISSCC Digest of Technical Papers.
Thomas J. Chaney,, Digital Phase Adjustment Circuit for ATM and ATM–Like Data Formats, Washington University Press, St. Louis Applied Research Laboratory.

* cited by examiner

Primary Examiner—Hassan Kizou
Assistant Examiner—Joe Logsdan
(74) Attorney, Agent, or Firm—Scully, Scott, Murphy & Presser

(57) ABSTRACT

The present invention presents an anti-meta trap (AMT) circuit for maintaining the data integrity of transmitted bit data in various applications. The anti-meta trap (AMT) circuit implement bit data integrity checks to prevent bit data from being misinterpreted at the bit level, that is, from being sampled at a data transition state. The invention also presents an anti-meta circuit combined with an auto-synchronization circuit to synchronize the phase of complete, bit-data verified cells, e.g., ATM data cells. The combined AMT-ASC is therefore able to verify the integrity of the data at the bit level, and synchronizing fixed-length data cells.

4 Claims, 13 Drawing Sheets

APPARATUS FOR VERIFYING DATA INTEGRITY AND SYNCHRONIZING ATM CELL DATA FORMAT FOR PROCESSING

BACKGROUND OF THE INVENTION

Asynchronous transfer mode, or ATM technology (hereafter "ATM"), may be described broadly as a switched, connection-oriented networking technology. ATM technology embodies a cell-based fast-packet data communication structure which may support data transfer rates from 1.544 Mbps to up to 10 Gbps. Within ATM networks, ATM switches for routing network data support dedicated media connections running in parallel. When data are transferred in an ATM network, a switched virtual circuit (SVC) is established between the sender and the receiver. Supporting the media connections requires that the ATM switches simultaneously support transmission and routing of very large amounts of data. The use of ATM switching technology for intra-network communications is found to eliminate the bandwidth contention and data bottlenecks found on conventional, or non-ATM shared-media networks,. e.g., Ethernet, Token Ring and FDDI. ATM technology, by its dedicated, high-speed data connections or switches, facilitates broadband multiservice networking which will support a virtually unlimited number of users.

As mentioned, ATM data are cell-structured fast-packet structures. The standardized ATM data structure includes a fixed number of serial data bits (i.e., 48 bytes), preceded by a fixed number of bits comprising an information header (i.e., 5 bytes). To capitalize of its ability to distribute large amounts of data very quickly (Gigabit rate), ATM data are switched very quickly, preferably error free at the data bit level, and also aligned in phase at the cell level at process and/or input. Phase misalignment errors in switched cell data result in bit data transfer error. And even small differences in the lengths of leads to various data input interfaces (e.g., at an ATM switch) can result in phase misalignment of data for sampling (switching), and, therefore, bit corruption.

More particularly, the differences in the length of interconnection wires, cables, etc., between the chips (or boards), as well as the phase drift between data and clock signals, can render synchronization of ATM switching data difficult, resulting in bit corruption, especially as operation speeds continue to increase with evolving technology. And various efforts are known which attempt to address the need to maintain the data integrity, at a bit and cell level, without effecting the speed of data throughput. For example, a technical paper by Woeste et al., Digital-Phase Alligner Macro For Clock Tree Compensation With 70 ps Jitter, ISSCC DIGEST OF TECHNICAL PAPERS, pg. 136–137, February, 1996, describes apparatus which attempts to solve conventional problems associated with skew between clock and data signals in high speed data transfer circuitry.

Woeste et al. describes a digital phase aligner (DPA) which is asserted to decrease troublesome chip-to-chip clock skews caused by process and temperature variations of on-chip clock trees in multiple chip synchronization systems having multiple clock domains, such as ATM. The method discussed adjusts the delay of the variable delay to align the output of the clock tree to the clock input of the chip. The delay is added to render the clock tree latency an integral number of cycles. However, because of increased switching speeds of today's ATM technology, implementing delay lines by way of transmission line lengths is not a viable solution. It slows down data throughput. The problem becomes particularly acute when the numbers of switching chips (i.e., referred to by function as transmitters and receivers) increases within a switching system, requiring large numbers of delay lines.

And like Woests, U.S. Pat. No. 4,700,347 to Rettberg et al., DIGITAL PHASE ADJUSTMENT, discloses a digital cell data, phase-adjustment apparatus which utilizes a plurality of delay lines to accommodate clock skew and data phase drift. The outputs of the delay lines are monitored and compared over a specified time, whereby the '347 apparatus selects one of the output signals. The '347 apparatus selects the output signal for use, that is, the signal to be called phase adjusted, by choosing the output signal which is in opposition to that pair of outputs that straddles the most transitions. However, like Woeste, such a scheme presents a complicated way to solve the problem confronting the ATM system designer In an article by Robert Cordell, A 45-Mbit/s CMOS VLSI Digital Phase Aligner, IEEE JSSC, vol. 23, No. 2, April, 1988, an alternate scheme for phase aligning ATM cell data is described. The Cordell digital phase aligner (DPA) provides an alignment method whereby numerous digital channels may be brought into phase alignment for subsequent synchronous processing, as required in ATM networks. In Cordell's DPA, the DPA hardware takes several samples of all incoming data and uses the multiple samples to adjust the phase of the same incoming digital data. The Cordell DPA utilizes a "metastable-resistant" version of a D-type flip flop for the sampling. Although the metastable state (non-one or non-zero) may be eliminated by use of Cordell's static master-slave D-type flip flop, the input data may still be subject to erroneous sampling by the D-type flip-flop if sampled at its transition. That is, the Cordell D flip flop design is still subject to sampling phase misalign data. Hence, Cordell falls short of its goals.

And a U.S. patent disclosure by Thomas J. Chaney, DIGITAL PHASE ADJUSTMENT CIRCUIT FOR ATM AND ATM-LIKE DATA FORMATS, filed May 6, 1996, describes yet another high speed data transfer circuit which takes advantage of the structure of ATM and ATM-like data formats for increased ATM data-throughput. Chaney utilizes a fixed pattern of data which is sampled multiple times, and implements a phase adjustment decision based on a comparison of the multiple samples. The sample chosen by comparison is then used as "good" data. However, Chaney describes no means which prevent sampling of the "good" data in its meta-stable state. So while Chaney may have the potential for avoiding phase misalignment, it does not provide means which could be used in an ATM switching network to avoid both possible bit and phase adjustment error.

OBJECTS AND SUMMARY OF THE INVENTION

Hence it an object of the present invention to provide novel data verification circuitry for assuring data integrity before ATM cell processing at a bit level, as well as phase aligning the bit data at the cell level to overcome the limitations in conventional ATM switching technology.

It is another object of this invention to provide novel data processing circuitry for aligning a ATM cell formatted data before switching, at both a bit level, and at a synchronized cell level.

It is another object of this invention to provide unique digital circuit element which, when included in data processing circuitry, minimizes and/or eliminates the possibility that bit data to be processed by the circuitry will be sampled at or during a data transitional state.

It is another object of this invention to provide unique circuitry for use in ATM processing/switching system which aligns the phase of out-of-phase ATM data cells arriving at an ATM system circuit element.

In one embodiment, the present invention comprises an anti-meta trap (AMT) circuit for implementation within digital circuitry in order to verify the stability of data to be utilized by the digital circuitry. In particular, the AMT circuit assures that data for processing by the digital circuitry is not sampled in a transitional state and hence being misinterpreted at the bit level, essentially verifying the integrity of each data bit used. To accomplish the verification, the anti-meta trap (AMT) circuit samples each data bit four (4) different times using four distinct bit-related clocking signals realizing two pair (i.e., four) of time-related sampled signals for each data bit. Each pair of sampled signals is compared, which comparison enables the AMT to determine where the anti-meta state of the sampled data bit lies, with respect to the four clocking signals. Because the AMT determines the transition state portion of the data bit, it also "knows" which of the sampled signals is not sampled at a transitional state. The AMT circuit thereby passes stable or verified bit data.

In a second embodiment of the invention, AMT circuits for verifying the integrity of individual data bits for processing is combined with an auto-synchronization circuit which synchronizes the phase of complete cells of bit data after the stability of same is first verified at a bit level by an AMT circuit. Such a combination is particularly useful in asynchronous transfer mode (ATM) processing systems. That is, by combining an AMT circuit with an ASC, the present invention is able to verify the integrity of data bits contained in fixed-length data cells being routed through an ATM circuit element (e.g., ATM switch), and aligning the phase of the verified data cell before passing same through the ATM processing circuitry.

BRIEF DESCRIPTION OF THE DRAWING FIGURES

DETAILED DESCRIPTION OF THE PREFERRED EMBODIMENTS

Figure 1A:
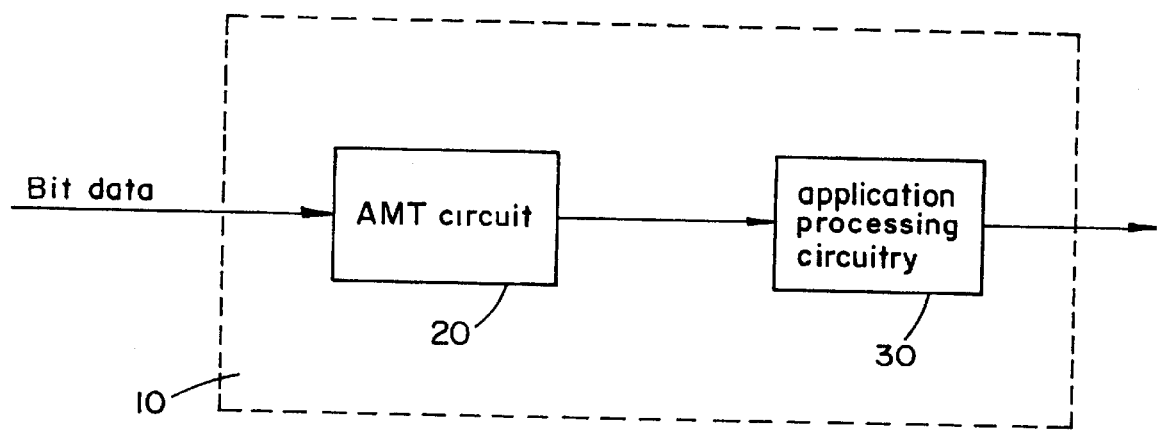
FIG. 1A is schematic diagram of digital circuit which includes an anti-meta trap (AMT) circuit of this invention.

A first embodiment of this invention is shown in FIG. 1A as a digital circuit 10. Digital circuit 10 includes an anti-meta trap circuit 20 for verifying the integrity of received bit before each data bit is passed to application processing circuitry 30 comprising the digital circuit. The application processing circuitry 30 may embody any digital processing function known to those skilled in the art. Each AMT circuit 20 functions to ensure that each bit of data contained in data signals received at the digital circuit 10 is processed after verification that the data has not been sampled at a transition state of the data bit cycle. In particular, the data bit is sampled at a place in its cycle such that the sampled bit value is guaranteed to be stable, that is, in its non meta-stable state. As used herein, meta-stable data shall be defined broadly as bit data values which result from sampling of bit data at a transition state within the portion of the data bit cycle such that the sampled bit value may be invalid.

Hence, each bit of data received by digital circuit 10 is sampled first by the AMT circuit 20 to ensure that the application processing circuit 30 receives stable, verified data bits. The AMT carries out its task by sampling each data bit received at circuit 10 four times to generate four sampled signals. The AMT then compares the four sampled signals to determine where, or at which point in the sampling clock period, resides the data transition portion for that bit. By "knowing" the position of the bit's transition state, data may be passed to application processing circuitry which is known not to be sampled at a transition state. That is, by comparing pairs of sampled signals, the AMT determines at which portion of the data period the transition state exists, and therefore, at which portion were the "non-transition state" samples derived.

Figure 1B:
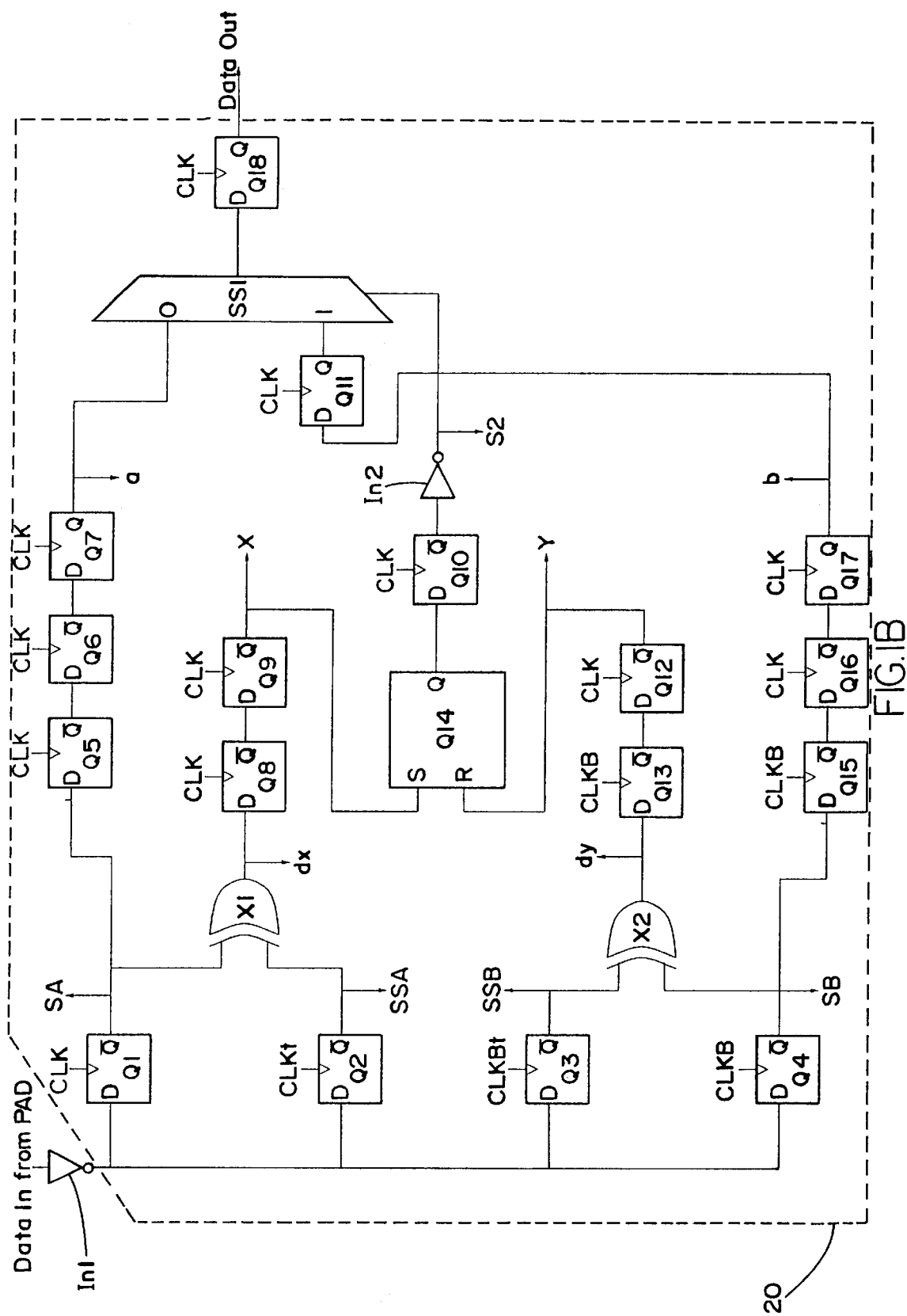
FIG. 1B is a detailed schematic representation of an anti-meta trap of the present invention as shown in FIG. 1A.

FIG. 1B is a detailed schematic diagram of a preferred AMT circuit of the. invention (as well as the AMT in FIG. 5, to be described in detail below), such as AMT circuit 20 described above. It should be noted that the AMT circuit 20 may be readily implemented (constructed) by those skilled in the art using a standard cell library. AMT circuit 20 receives bit data for verification via a buffer or inverter In1, which inverter typically receives the incoming bit data from a PAD (not shown in the figure). Each received data bit signal is sampled by each of four D-type flip flops, Q1, Q2, Q3 and Q4, to generate four sampled signals SA, SSA, SSB and SB, respectively. The sampled signals mentioned are generated in accordance with four distinct but related clocking signals CLK, CLKt, CLKBt and CLKB, respectively. The outputs of Q1 and Q2 are coupled as inputs to an exclusive OR circuit, X1, and the outputs of Q3 and Q4 are coupled to the inputs of an exclusive OR circuit, X2. The output of exclusive OR circuit Xi is coupled through two D-type flip flops Q8, Q9 and provided therefrom as the set input of an S-R flip flop Q14. The output of exclusive OR X2 is coupled though two D-type flip flops Q13, Q12 and provided therefrom as the Reset input to S-R flip flop Q14.

Figure 2A:
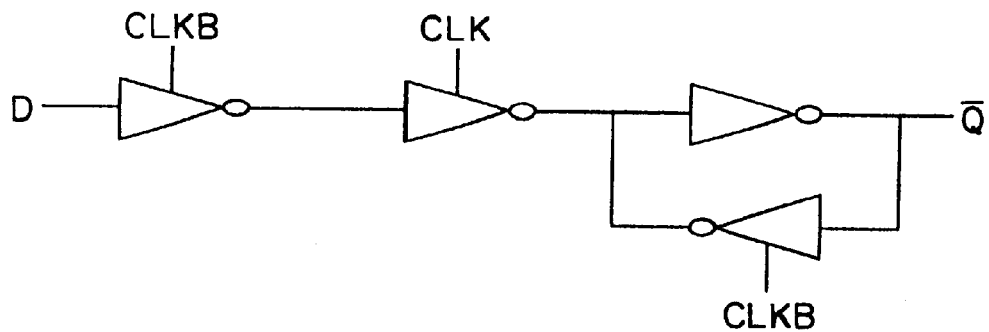
FIGS. 2A and 2B are detailed and more detailed schematic representations, respectively, of a register preferred for constructing the apparatus of this invention.
Figure 2B:
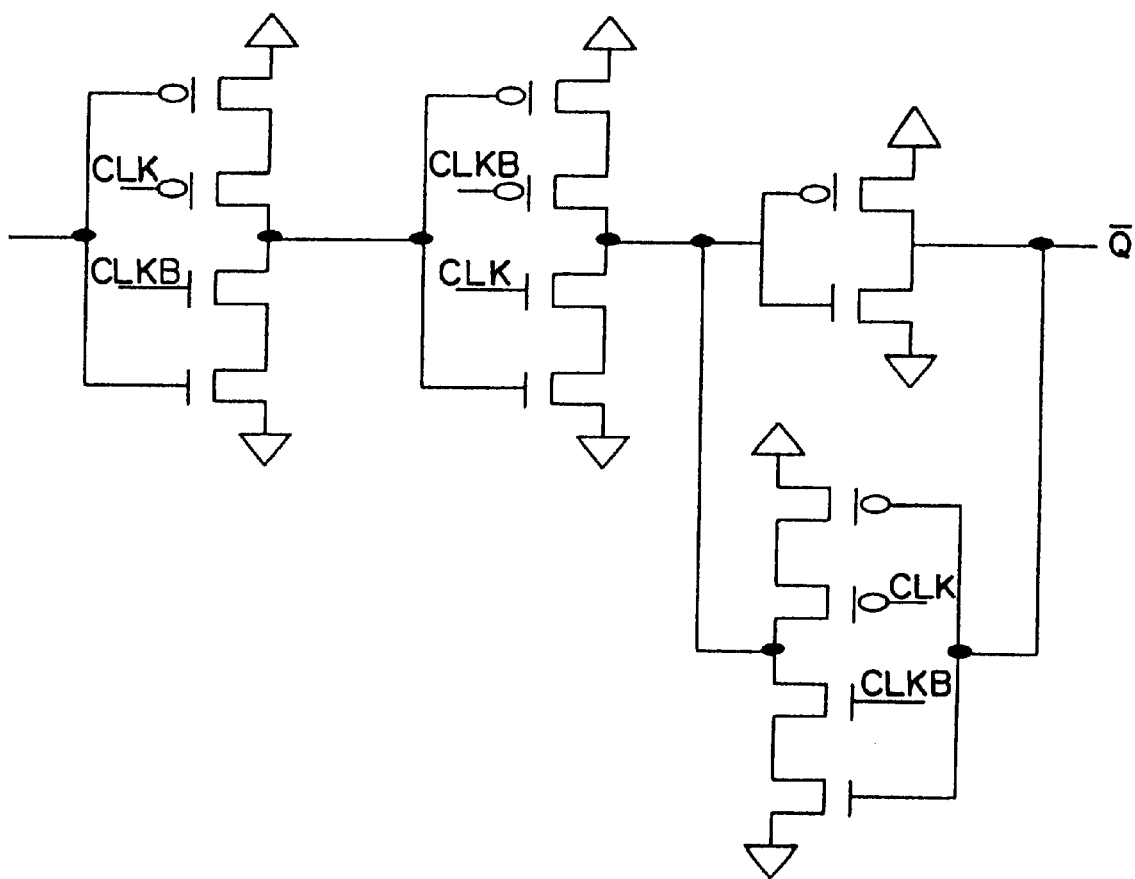

The output of D-type flip flop Q1 is also coupled through three D-type flip flops Q5, Q6, and Q7 into the "zero" labeled input port of a selector SS1. The output from S-R flip flop Q14 is coupled through a D-type flip flop Q10, and an inverter In2, into the select input port of selector SS1. The output of D-type flip flop Q4 is coupled through D-type flip flops Q15, Q16, Q17 and Q11 into the "one" labeled input port of selector SS1. The selected output of selector SS 1 is passed through another D-type flip flop Q 18 and out of the AMT 20 as a verified stable data bit value. The D-type flip flops of AMT 20, shown in detail in FIGS. 2A, 2B, preferably dynamic D flip flops which include a static output stage to prevent the non-zero or non-one (meta stable) state at the output of the register.

Figures 3A, 3B:
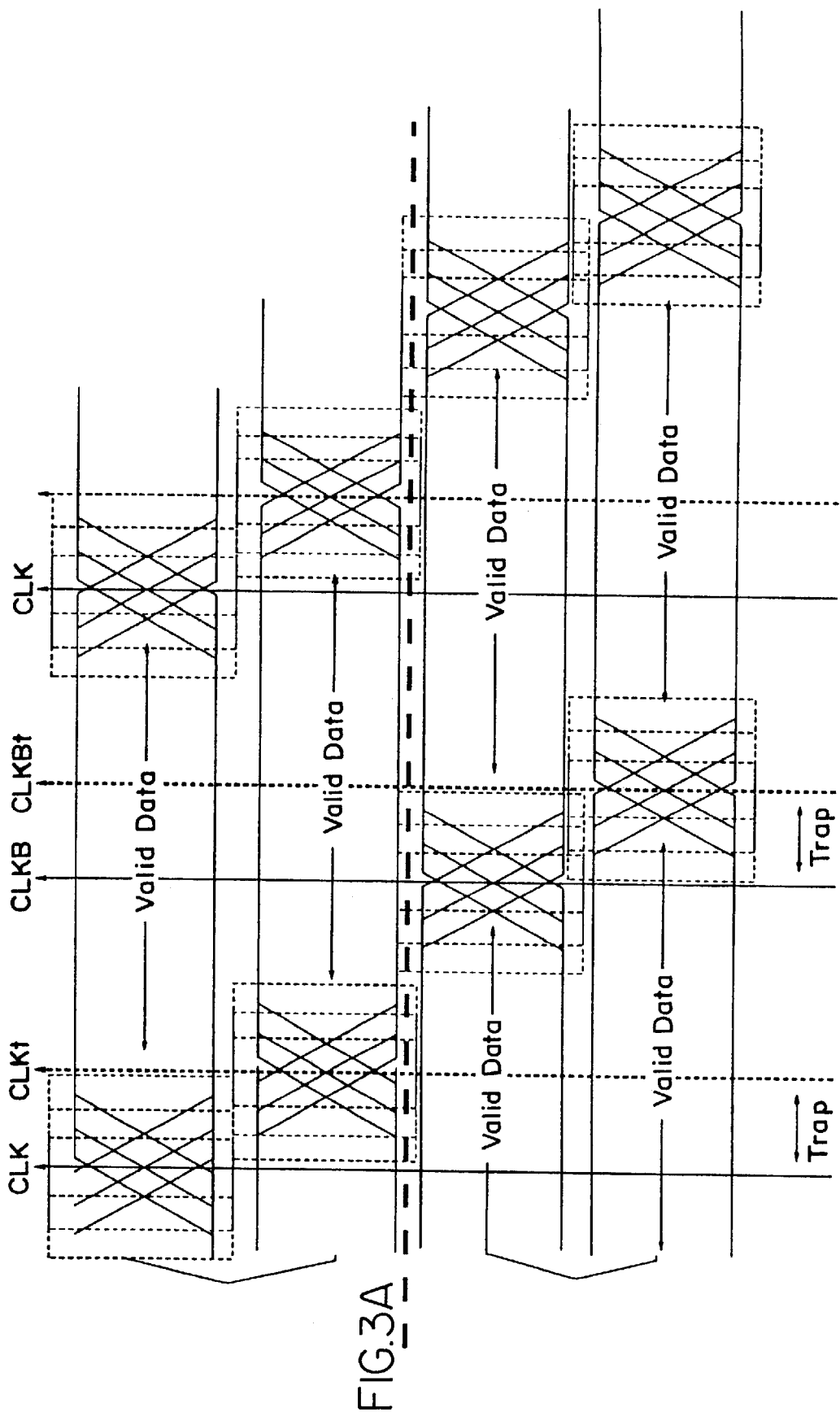
FIGS. 3A, 3B are graphical signal waveform representations, respectively, each identifying two signal samples of input data taken at an anti-meta trap (AMT) of this invention.

FIGS. 3A and 3B are timing diagrams highlighting the two pair of sampled signals SA and SSA, and SB and SSA, respectively. As mentioned, the four clock or sampling signals CLK, CLKt, CLKB and CLKBt are related, but out of phase to varying degrees. Signal CLK and signal CLKB are preferably 180 degrees out of phase. Signal CLKt is a slightly delayed version of signal CLK, and signal CLKBt is a slightly delayed version of signal CLKB, varied according to the designers needs for the AMT 20. The comparisons of signals SA to SSA, and SB to SSB provides the AMT with the ability to "know" which sampled signals are (were) generated by sampling the data signal at a data transition period. Data sampled at a data bit transition portion of its cycle could result in a sampled value which is meta-stable, as mentioned above. To avoid this potential problem, the AMT 20 operates in accordance with several rules to verify valid or stable data In summary, the rules are:

Rule 1: If signal SA=signal SSA, or, if signal SB=signal SSB, the state of the output selection remains the same (either of the SA or the SB sampled bit signals are used for the output).

Rule 2: If signal SA≠signal SSA, and the current output state of the AMT is signal SA, the output state (signal SA) will be replaced by signal SB (sampled by signal CLKB, the inverse of signal CLK).

Rule 3: If signal SB≠signal SSB, and the current output state of the AMT is signal SB, the output state (signal SB) will be replaced by signal SA (sampled by signal CLK, the inverse of CLKB).

In summary, if signal SA (input data sampled by the CLK signal) is compared found not to be equal to signal SSA (input data sampled by signal CLKt), the verified signal output (the current signal SA) is changed to the data signal SB (input data sampled by signal CLKB). Similarly, if sampled signal SB (input data sampled by signal CLKB) is found not to be equal to sampled signal SSB (input data sampled by signal CLKBt), then the current sampled signal output (SB) is replaced as output by sampled signal SA (input data sampled by signal CLK).

Each AMT 120 (described in great detail in reference to AMT 20 of FIG. 1B) therefore efficiently and correctly identifies the location timewise, within each data bit period, of data which could be meta-stable (sampled at a data transition period), and which is verified to not be in a meta-stable state To correctly determine the data transition in the period of the data bit, the time difference between each pair of signals (referred to hereinafter as "trap") must be predetermined. The size of the trap should be chosen to be the maximum transition time of the data to be sampled, plus the set-up time for the logical hardware comprising the system. As used herein, the term "trap" shall be defined as the time interval between two associated latching clocks, e.g., CLK and CLKt, and CLKB and CLKBt. That is, the signals CLKt and CLKBt are the signals CLK and CLKB, respectively, delayed by the amount of the trap.

Sampled signal pair SA and SSA, and signal pair SB and SSB, are input into exclusive OR circuits X1 and X2, respectively, as is shown in FIGS. 3A and 3B. The output of exclusive OR circuit X1 (or node "dx") provides the comparison result of signals SA and SSA (if signal SA ≠signal SSA, then dx=1, otherwise dx=0). The output of exclusive OR circuit X2 (or node "dy") provides the comparison result of sampled signals SB and SSB (if signal SB ≠signal SSB, then dy=1, otherwise dy=0). The output of exclusive OR circuit X1 (the signal at node dx) is passed though D-type flip flops Q8 and Q9 in order to a generate delayed version of the "dx" signal. The output of exclusive OR circuit X1 (the signal at node dy) is passed though D-type flip flops Q13 and Q12 in order to a generate delayed version of the "dy" signal. The delayed signals are identified in FIG. 1B as X and Y, respectively.

The reader should note that nodes "dx" and "dy", the outputs of exclusive OR circuits X1 and X2, respectively, provide the comparison result at each clock period. Consequently, during each clock period (a complete period of the CLK signal) the validity of the data input bit is verified such that only valid samples will appear at the output of the AMT 20 (and AMT 120 of FIG. 5). And simulation results (to be discussed in great detail below) clearly establish that the size of the trap should be approximately equal to the transition time (i.e., maximum of rising or falling time) of each bit within a bit stream plus the setup time for the sampling register (that is, the D-type flip flops shown in detail in FIGS. 3).

The signal output from S-R flip flop Q14 passes through another D-type flip flop Q10 (clocked by signal CLK) and inverter In2 to generate a select signal S2. When S-R flip flop Q14 is reset, node S2 is set to the state zero, and the data signal present at node "A" is used as the data signal output from the AMT 20 (and AMT 120 of FIG. 5). That is, circuit SSI receives at its "active" input a "1-state" signal. In response, SS1 outputs the data signal SA delayed by the inherent delay of SSI, Q5, Q6, Q7, and Q18. That is, node A provides signal SA after signal SA passes through three d-type flip flops Q5, Q6 and Q7. Alternatively, if Q14 is set, S2 is set to a one-state and the data output of the AMT will be changed from data signal SA to data signal SB after same signal SB is delayed by Q15, Q16, Q17, Q11, SS1 and Q18. And when both S=0 and R=0 (that is, X and Y are both equal to zero), node S2 remains in its previous state.

The X and Y outputs of D-type flip flops Q9 and Q12 are provided as the set and reset inputs respectively to S-R flip flop Q14. S-R flip flop Q14 sets its output to a "1-state" if signal SA is found not equal or equivalent to signal SSA, and to a "0-state" if signal SB is not found to equal signal SSB, respectively. That is, if the output of exclusive OR circuit X1 exists at its "1-state", the data bit is concluded by the circuitry to have been sampled at its transition state by either CLK or CLKt. In response, the sampled data bit signal output from flip flop Q18 (that is, from the AMT) is switched from signal SA (assuming the current output is signal SA) to signal SB. If the output of exclusive OR circuit X2 is at its "1-state", the data bit is concluded to be sampled at its transition state by either CLKB or CLKBt. In response, the sampled data bit signal output from flip flop Q18 (that is, from the AMT) is switched from signal SB (assuming the current output signal is signal SB) to sampled signal SA.

To assure that an AMT is functioning properly, when first powered up, the system controller should generate and "transmit" to the AMT 20 a data bit pattern of 010101... The AMT utilizes the data bit pattern to verify the incoming pattern and therefore AMT proper operation The timing diagrams of FIGS. 4 represent several examples of AMT operation.

Figure 4A:
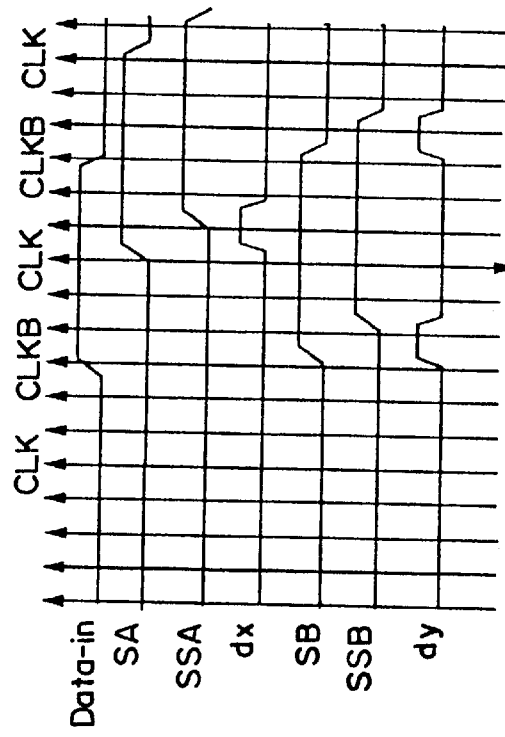
FIGS. 4A, 4B, 4C and 4D are timing diagrams which identify various examples of the operation of the AMT of this invention which is shown in FIG. 1A and in detail in FIG. 1B.
Figure 4B:
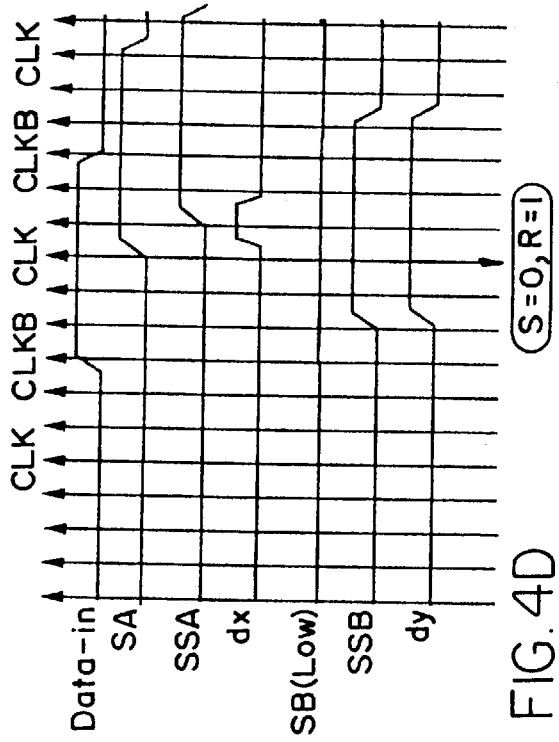

That is, FIGS. 4A and 4B together represent the case where the CLK signal samples the input data at its transition period, i.e., resulting in the bit value of sampled signal SA in a meta-stable state. That is, FIGS. 4A and 4B show the same data-in signal sampled at its transition period resulting in an SA=1 in FIG. 4A, and an SA=0 in FIG. 4B. The signal SA generated by sampling the data-in signal shown in FIG. 4A is actually valid. That is, the AMT will find that sampled signal SA is equal to sampled signal SSA, and sampled signal SB equal to sampled signal SSB. Assuming that the state of S-R flip flop Q14 was high before the operation, it will remain high at completion of the operation, and consequently the output of the AMT is unchanged. If sampled signal SA is found by the AMT to not be equal to sampled signal SSA, and sampled signal SB is found equal to sampled signal SSB, node "dx" is set to a "one" state (these conditions are shown in FIG. 4B). Thus, the inputs of S-R flip flop Q14 become S=1 and R=0. Consequently, node S2 is set to a "one" state and, according to Rule 2, the AMT takes the data from node "b" for the output of the AMT 20.

Figure 4C:
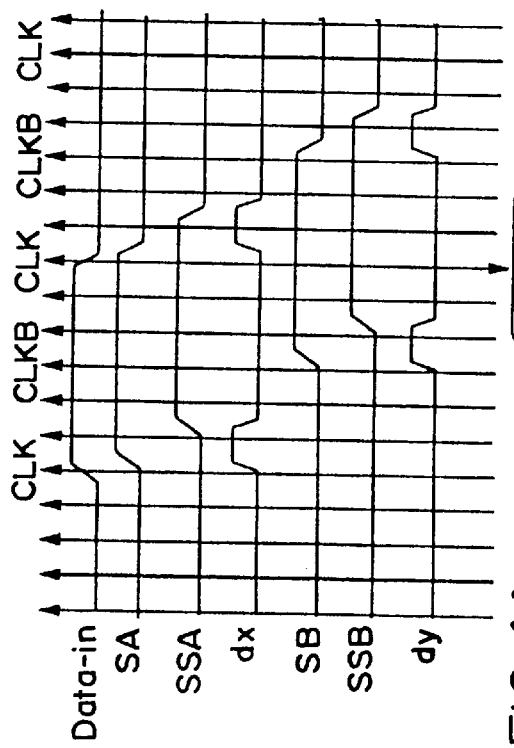
Figure 4D:
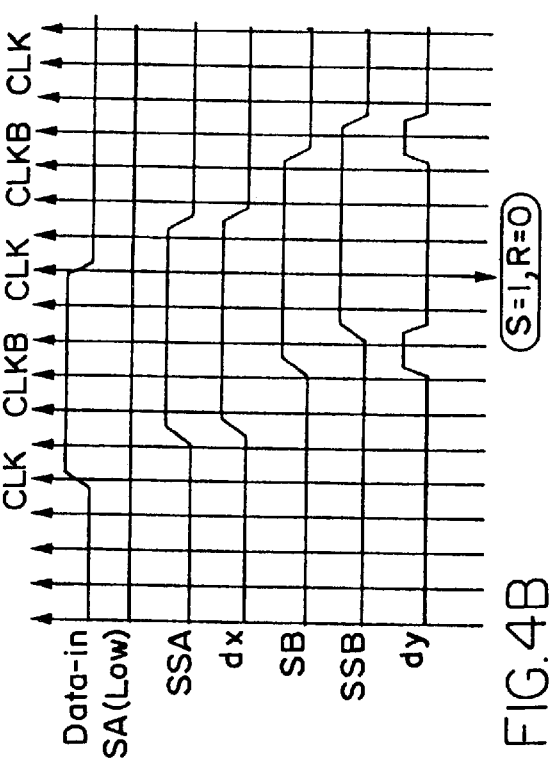

FIGS. 4C and 4D represent the case where the CLKB signal's triggering edge samples the input data during its transition period. Thus sampled signal SB is determined to exist in a meta-stable state. For that matter, FIG. 4C shows the sampled signal SB as High, and FIG. 4D shows sampled signal SB as low. If signal SB is found equal to signal SSB, and signal SA is found equal to signal SSA, SB is determined to be valid and the state of the S-R flipflop Q14 remains unchanged. Consequently the output of AMT 20 remains unchanged. However, the sampled signal SB may be determined to be meta stable (or invalid), as is shown in FIG. 4D. That is, FIG. 4D shows the conditions under which sampled signal SB is invalid when it is found not to equal sampled signal SSB, and sampled signal SA is found equal to sampled signal SSA. In this case, node "dy" is set to state one. Thus the inputs of the S-R flip-flop Q14 are set to S=0 and R=1, node S2 is set to state zero and, according to Rule 3, the AMT takes the data output from node "a" as the AMT 120 (operating in accordance with the operatiopn of the AMT 20 shown in FIG. 1A) output.

Figure 5:
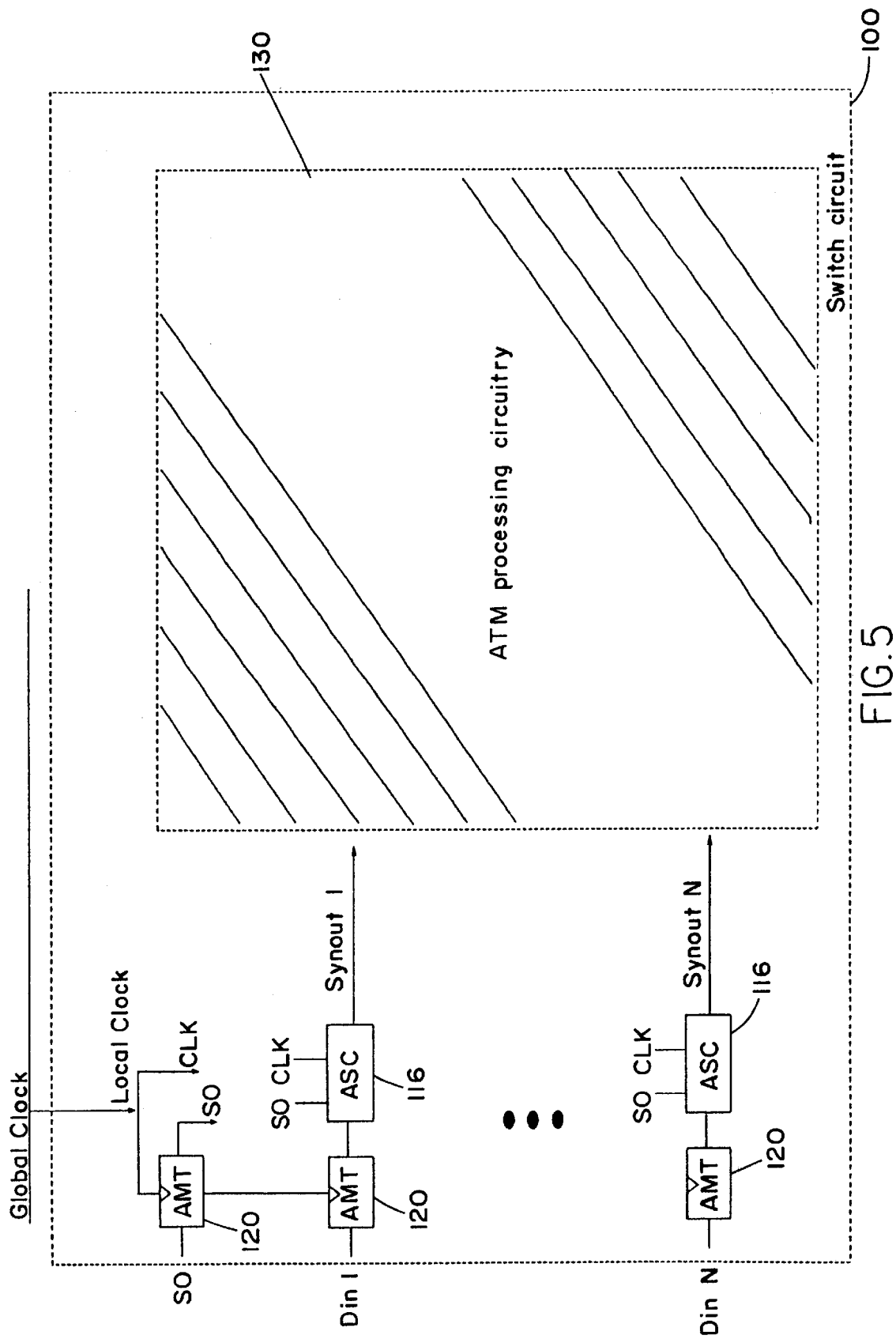
FIG. 5 is a schematic diagram depicting an ATM processing element which utilizes both ASC and AMT circuits, whereby data processed by the ATM processing element is first verified at the bit level, and aligned at the cell boundary levels.
Figure 7:
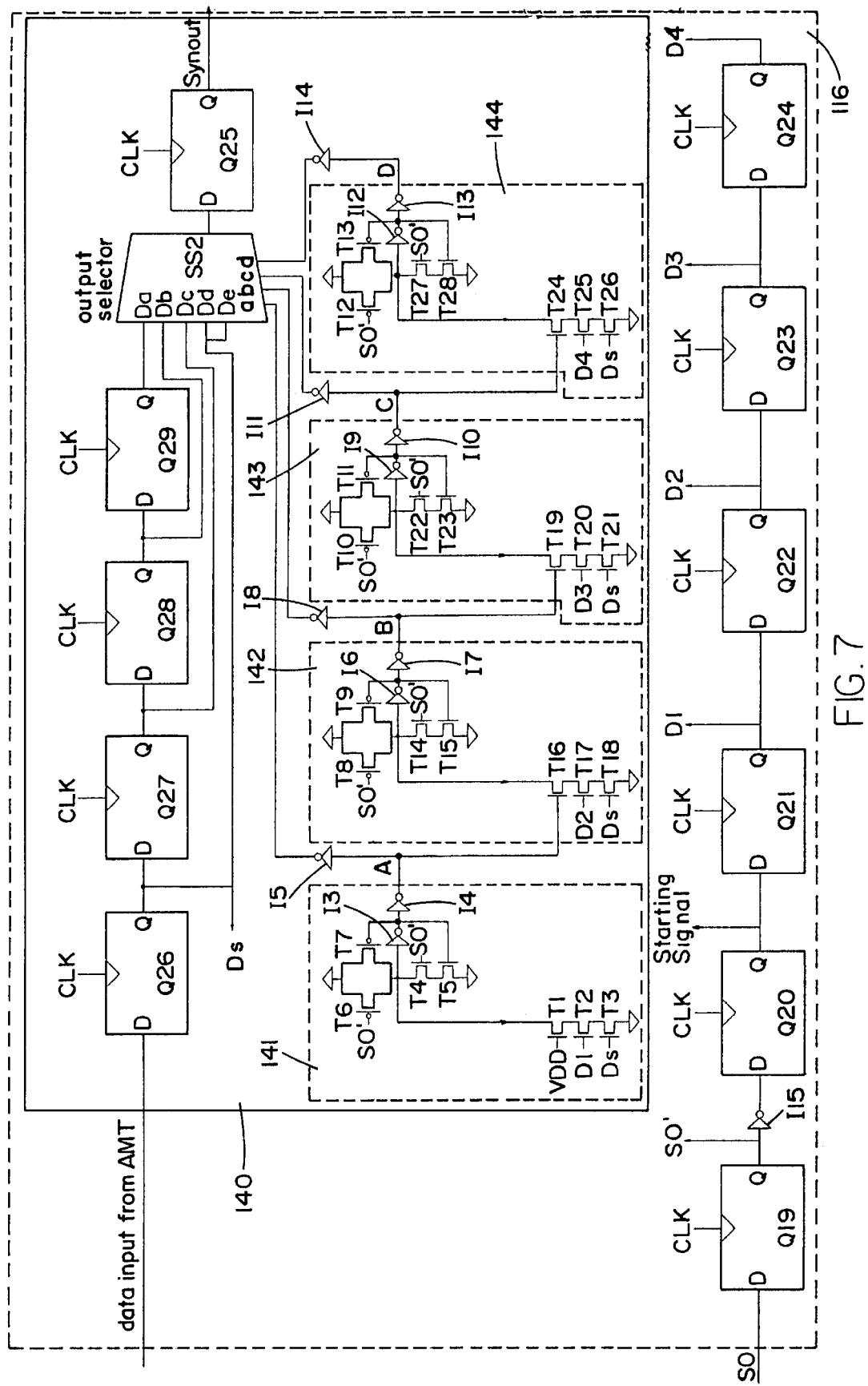
FIG. 7 is a circuit diagram of a preferred ASC of this invention.

A second embodiment of this invention, switching circuitry 100, is shown in FIG. 5 to include a plurality of the AMT circuits as were described above. Switching circuitry 100 includes N data input ports Din1–DInN, N+1 AMTs (identified as AMT 120 in FIG. 5), a port for receiving a start of cell signal, SOC, and N auto synchronization circuits (ASCs) 116 for synchronizing the switched cell data after the integrity of same has been verified at the bit level by the AMT circuits. FIG. 7 shows detailed circuitry comprising a preferred ASC 116 of this invention. Cell boundary reference signal, SO, is a signal which is generated at a system level and transmitted between switching circuitry (and like circuitry comprising the overall system in which it resides) to identify and reference the start of any cell or frame of digital data transmitted (the first bit position information).

Each of the "N" ASCs 116 comprising switching circuitry 100 is coupled between the "N" AMT circuits 120 and ATM processing circuit 130, via "N" synchronized data ports, Synout-1 through Synout-N. A first or $(N+1)_{th}$ AMT is included to verify the integrity of a cell boundary reference signal, SO (FIG. 8), which is generated from Start of cell (SOC) signal, described above. For that matter, several other signals used by the ASCs 116 will now be described to render the explanation of ASC operation which follows more clear.

Figure 8:
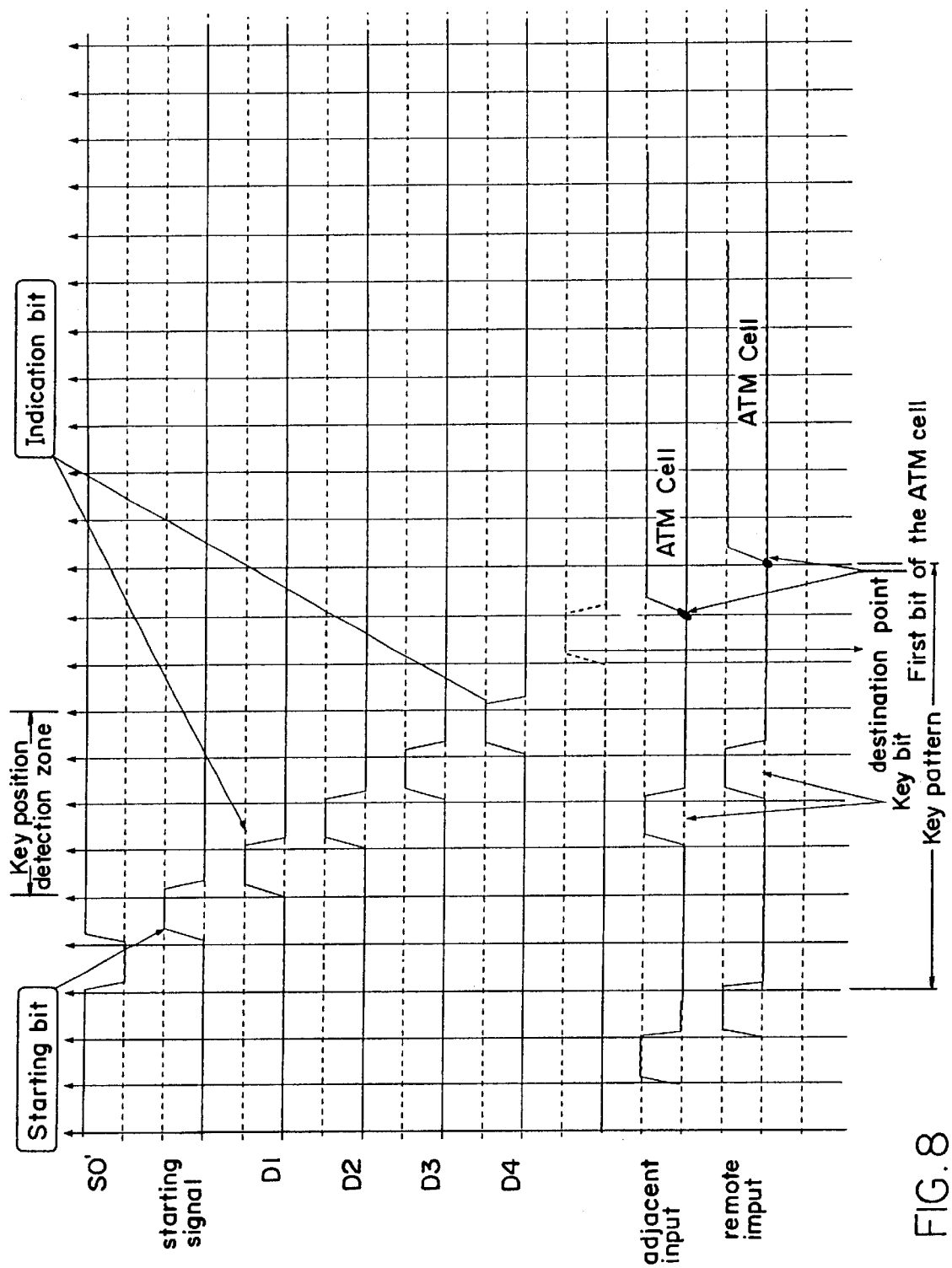
FIG. 8 is a signal diagram which highlights the signals utilized in the preferred ASC shown in FIG. 7.

First, a signal SO' is derived from the cell boundary reference signal SO by delaying signal SO one clock cycle (FIG. 8). A signal identified as starting signal is derived from signal SO' by inverting signal SO' and delaying same one clock cycle (FIG. 8). D1, D2, D3 and D4 are defined as position indicating signals (FIG. 8), and the signal "destination point indicator" is derived from delaying the starting bit (within starting signal) by several clock cycles (FIG. 8), depending on the ASC design. The term "adjacent input" shall be defined as that data input port (i.e., one of ports DIn-1-DIn-N) located physically closest to a source transmitting data to circuitry 100 (i.e., the shortest physical electrical path length from transmitter to receiver). The term "destination signal from adjacent input" is that signal derived from the data signal arriving at the adjacent input (and shown in FIG. 8). The term "remote input" shall be defined as that data input port (one of ports Din-1 to Din-N) connected to a "transmitter" or source which is known and measured to be the greatest electrical path length of all transmission lines connected to circuitry 100. The term "destination signal from remote input" is that signal derived from the data signal arriving at the remote input, and consequently suffering from the largest delay (FIG. 8).

Auto-Synchronization Circuit (ASC)

As described, the AMT circuits 120 pass verified bit data to each corresponding ASC 116. It is within the ASC that the verified bit data are synchronized at the cell level. The "N" auto-synchronization circuits (ASCs) 116 are constructed to adjust complete cells comprising verified bit data (arriving from each of the N AMTs 120) so all cells are aligned at their first bit position. To accomplish same task, the first bit position of each cell of data arriving at an ASC 116 is compared to cell boundary reference signal SO. If a delay difference is detected, the input data is/are adjusted so that the first bit of every cell (or frame) is aligned before all the data cells are synchronously passed into the ATM circuitry 130.

The design herein accounts for the fact that in ATM, there are always some unassigned cells which may be transmitted and received between the ATM system's communicating switch chip sets. In the cell body of these unassigned cells a 010101... pattern can be filled in, so when the AMT of the receiver chip receives these unassigned cells, it uses this pattern to catch the invalid samples. The ASC consequently adjusts the number of bits delay on the valid data to align complete cells. And by utilizing the AMT concept and ASC design, the synchronization problem between communicating chips has a reliable solution. Therefore, the maximum operation speed of the system can be pushed to the limit of the technology used.

The preferred ASC of FIG. 7 is shown to comprise a number of flipflops to generate required timing signals for use with a portion of the ASC which will be referred to herein as a key match circuit 140. Key match circuit 140 implements the circuit's logical decision making regarding any delays to be imposed on cell data for synchronization by the ASC. Also comprising the ASCs is a set. of serially arranged (a string of) D-type flip flops Q19, Q20, Q21, Q22, Q23 and Q24 which are used to generate the signal SO', the starting signal, and four position indicating signals D1, D2, D3 and D4 from the cell boundary reference signal SO.

The key match circuit 140 comprises a string of serially arranged D-type flip flops Q26, Q27, Q28, and Q29, the individual outputs of which are also coupled as inputs Dd, Dc, Db and Da, respectively, to output selector SS2. Verified data from the corresponding AMT is provided directly into the key match circuit at flip flop Q26, the output of which is identified as both signals Ds and Dd. The output selector is driven to choose the data signal output with its respective delay by any of a number of inputs signals labeled a, b, c and d in FIG. 7. Signals a, b, c, and d are present at the output nodes of four detection circuits, 141, 142, 143 and 144. The detection circuits compare the key bit position (descibed in greater detail below) of data cells received from the AMT with the position indicating signals. Based on the comparison, and if determined necessary, each ASC will adjust or impose a delay on the cell data it is processing to align the boundary of the cell (or frame) to that of the data received at the other ASCs.

Detection circuits 141, 142, 143 and 144 implement the logic which determines which delayed data signal will be output from output selector SS2. The detection circuits are equivalent. Each detection circuit is essentially precharged by signal SO' provided at the gate of FETs T6, T8, T10, T12. These FETs are part of 4 respective dynamic NAND gates.

Figure 6:
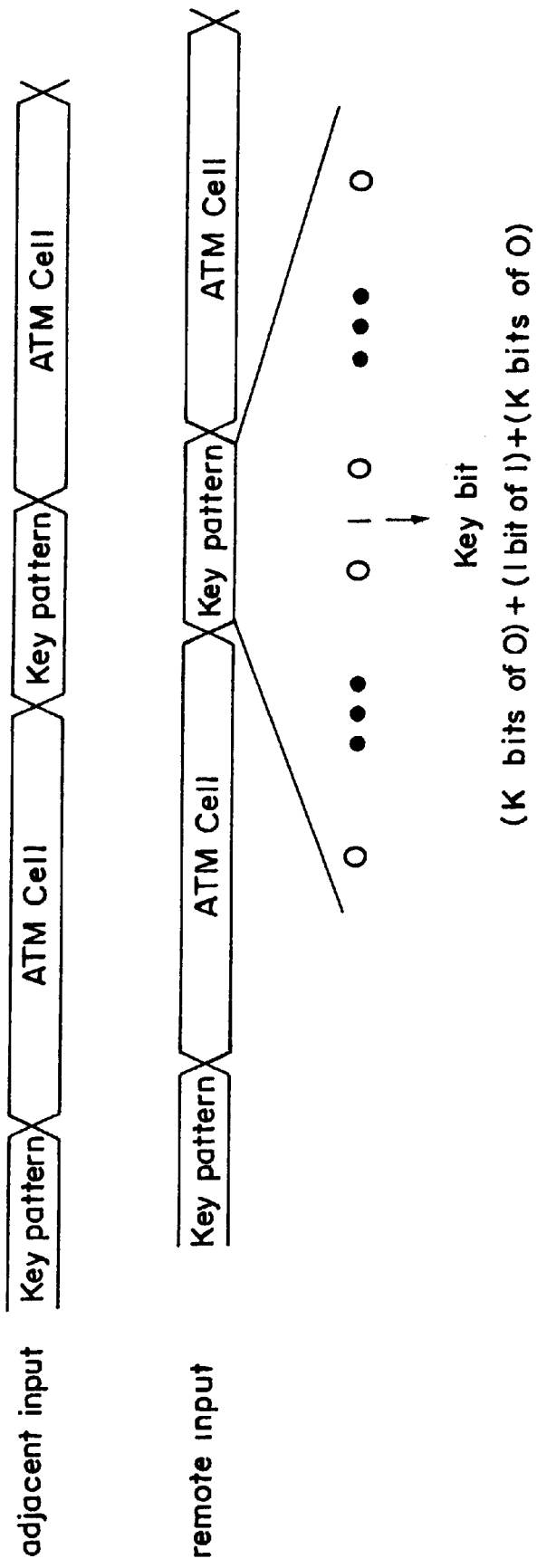
FIG. 6 is a data diagram which highlights the signal waveform structure of cell data necessary for effectively utilizing the ASCs of this invention.

A special bit pattern, referred to herein as a "key pattern", is used by the ASC in conjunction with the key match circuits to carry out the synchronization task. The construct of the special bit pattern, and its location in a frame of cell data, is exemplified in FIG. 6. The key pattern essentially serves two functions. The first function allows the key match circuit to determine the position of an indicating bit present in each of four position indicating signals D1, D2, D3 & D4, as shown in FIG. 8, with the key bit of the data signals derived from adjacent input and derived from remote input (i.e., the position of the key bit in the key pattern of the data signals). The second function of the key pattern is to separate sequential ATM data cells. The key pattern is appended to the data verified data signals before the or header portions of each transferred cell frame. A number of bits in the key pattern define what may be referred to as a key position detection zone within each cell. A preferred key pattern comprises a "K" bits which are 0-state bits for "K" CLK signal cycles before and after the key bit. That is, the key pattern includes "K" 0-state bits separated by a single 1-state bit (referred to as the key bit), and followed by anther "K" 0-state bits. K =4 in the preferred embodiment shown.

The cell boundary reference signal SO is utilized by D-type flip flops Q19, Q20, Q21, Q22, Q23 and Q24 present within ASC 116 to generate signal SO'. And from the signal, SO', the same D-type flip flops are used to generate four position indicating signals, D1, D2, D3 and D4, respectively. Indicating signals, D1, D2, D3 & D4, represent a different number of bit delays which may be incorporated into the data signal presently operated on by the ASC. That is, the first position indicating signal D1 is generated in accord with the signal SO' and output from Q21; the second position indicating signal D2 is generated in accord with signal SO' and Q22, the third position indicating signal D3 is generated in accord with signal SO' and Q23 and fourth position indicating signal D4 is generated with signal SO' and Q24. A destination point indicating signal (FIG. 8) is an indicator of the final bit position for every key bit in the input cell streams to be synchronized.

During ASC operation, data (signal Din) is/are provided to D-type flip flop Q26 by which a single data bit cycle delay is imposed, the delayed data identified as data signal Dd and Ds. Data signal Dd is provided as input to selector SS2, and D-type flip flop Q27. The data input to Q27 is/are delayed another data bit cycle and provided as input Dc to output selector SS2, and as input to D-type flip flop Q28. The data input to Q28 is/are delayed still another data bit cycle and provided as input Db to output selector SS2, and as input to a D-type flip flop Q29. The data input to Q29 is/are delayed still another data bit cycle and provided as input Da to output selector SS2. Output selector SS2 is controlled by its selector inputs, a, b, c, d, which selector inputs are generated by key match circuits 141, 142, 143 and 144, respectively, and present at nodes A, B, C & D. The delayed data output from selector SS2 is delayed an additional clock cycle through D-type flip flop Q25 before it is output synchronously with other ASC data through output port Synout.

When signal SO' goes low, all detection circuits in the key matching circuit 140 are pre-charged, and the status of the output nodes A, B, C, and D are set to high. Consequently, the ASC selects the data from the default node De of output selector SS2 shown in FIG. 7 (other than Da, Db or Dc). When the key bit position (of destination signal Ds) is found to match the indicating positions (i.e., the indication bit of signals D1 to Di, where i=4), one of the nodes (A, B, C or D ) will be discharged, which node correlates to the number of clock cycles of delay detected in the comparison. This may be described as a "matching" process. Specifically, if the key match circuit 140 finds that D1·Ds =1, node A is discharged. If the key match circuit 140 finds that D2·A·Ds= 1, node B is discharged. If the key match circuit 140 finds that D3·B·Ds=1, node C is discharged. If the key match circuit 140 finds that D4·C·Ds=1, node D is discharged. Once the matching process is accomplished, an output selector SS2 chooses the final output from one of the nodes Da, Db, Dc and Dd that contains the 4-bit to 1-bit delayed version of the input data, respectively. The ASC 116 chooses the various delayed data for output based on the state of the comparison result.

For illustration purposes, the reader should assume that the data from the remote input and the adjacent input have a one-bit delay difference. Such condition is represented by the signals comprising FIG. 8. That is, in FIG. 8, the key bit of the Ds signal received at the remote input appears one bit later in time than the key bit of the Ds signal received at the adjacent input. And as shown in FIG. 8, the key bit position of the Ds signal derived from the adjacent input matches the bit position of position indicating signal D2 generated by the key match circuit and shown in FIG. 8. Hence, the resulting adjacent input signal is delayed four bits because in the key match circuit 140, the three-bit delayed version of the adjacent data has been selected as output. An additional bit of delay is added (by Q25) after the delayed data signal is output from selector SS2.

Similarly, the remote input is delayed by three bits, i.e., two bits before the output selector and one bit delay after the output selector by D-type flip flop Q25. Therefore, the key bits in the Ds signals derived from both adjacent and remote inputs are aligned with the destination point indicating bit, which is the six-bit delayed version of the starting bit. Thus, the one-bit delay difference is compensated by the ASC circuit 116. Note that since each data input line passes through its own AMT 120, only an integer number of bits delay will occur at each ASC 116. In order to ensure that the key bit position of the Ds signals derived from each data input is covered by the detection zone, it is important to set the key bit position of the adjacent input at the same position as the indicating bit of the signal D2. Also, the key bit of the remote input is arranged to appear no later than the indicating bit of signal $D_{i-1}$. It follows that the effective number of bits delay compensation is equal to the number of detection circuits used in the key match circuit, minus three. Hence, if a larger delay compensation is needed, ASC circuit 116 may be easily modified to accommodate the larger required delay compensation (i.e., add more detection circuits in the Key Match Circuit).

In summary, with a total 2K+1 bits of key pattern, the ASC 116 can adjust the delay difference up to K-3 bits. And if the header of the data cell received at any of input ports DIn-1 through DIn-N increases by two bytes to accommodate the key pattern, a delay compensation of up to four bits is achievable.

Simulation Test Results

In order to verify the efficacy of the circuitry of this invention, several simulations were performed by a SPICE 3 simulator. The results of a few simulations performed are presented in FIGS. 9, 10, 11 & 12. The circuit parameters are extracted from the actual mask level layout, and correspond to HP 0.8 micron technology utilized. The simulation is performed to emulate a state where a time delay occurs in received input data to an AMT (whether due to a phase drift in the data of the clock signal). The simulation generates "test" cell data bit stream with an inherent phase drift, as well as an input clock signal CLK. This "test" cell data bit stream is generated, such as arbitrary bit pattern 0101010101001001 (DIn of FIG. 9). The clock rate is 250 MHz and identified in FIG. 9 as LCLK (signal LCLK=signal CLK in the simulation).

Figure 9:
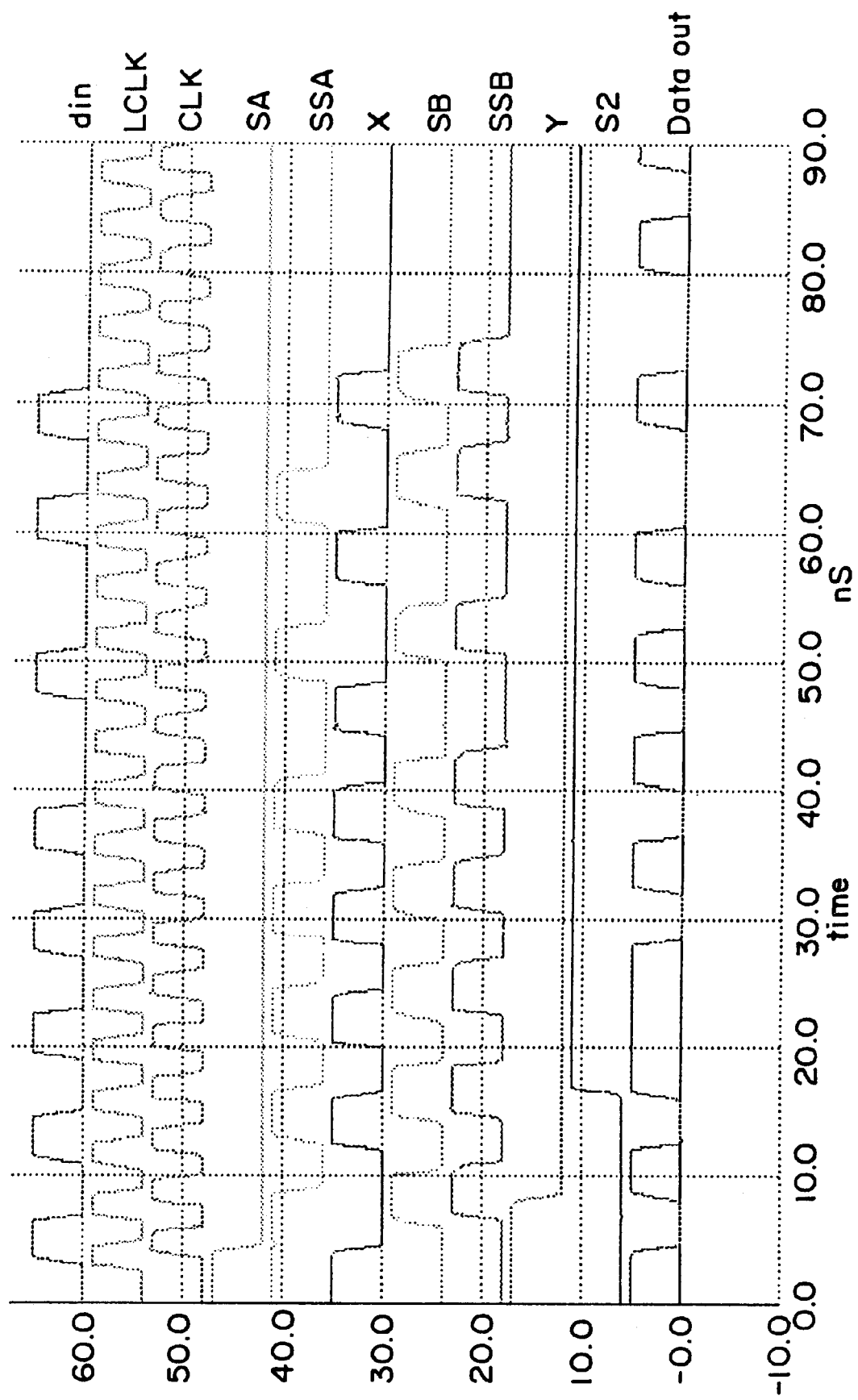
FIG. 9 is a timing diagram generated by a spice-3 simulation of an AMT utilized in an embodiment of the present invention.

FIG. 9 shows signals labeled SA, SSA, SB, SSB, X, Y, and S2, which signals correspond to similarly signals present at such nodes which were described in detail relative to FIG. 1B. The signals SA, SSA, SB, and SSB (as described above) are the data sampled by CLK, CLKt, CLKB, and CLKBt, respectively. The signal labeled "X" is the comparison result of SA and SSA, and the signal labeled "Y" is the comparison result of SB and SSB. Signal S2 indicates the AMT's output selection. That is, when the status of signal S2 is low, the AMT output will be provided as the sampled data represented by signal SA. When signal S2 is in its high (or "1") state, the AMT outputs the sampled data from node SB (that is, signal SB).

During simulation, the simulated AMT 120 was found to respond to invalid data sampled by signal CLK. That is, when the input clock signal LCLK is shifted (by the simulator) to a point in time where the input data is sampled at its transition interval (i.e., its meta-stable state), the signal labeled S2 is set to 1-state. And as described above, the simulated AMT 120 therefore selects the sampled signal SB (sampled by signal CLKB) as its output (FIG. 9) instead of the sampled signal SA (sampled by CLK signal).

Figure 10:
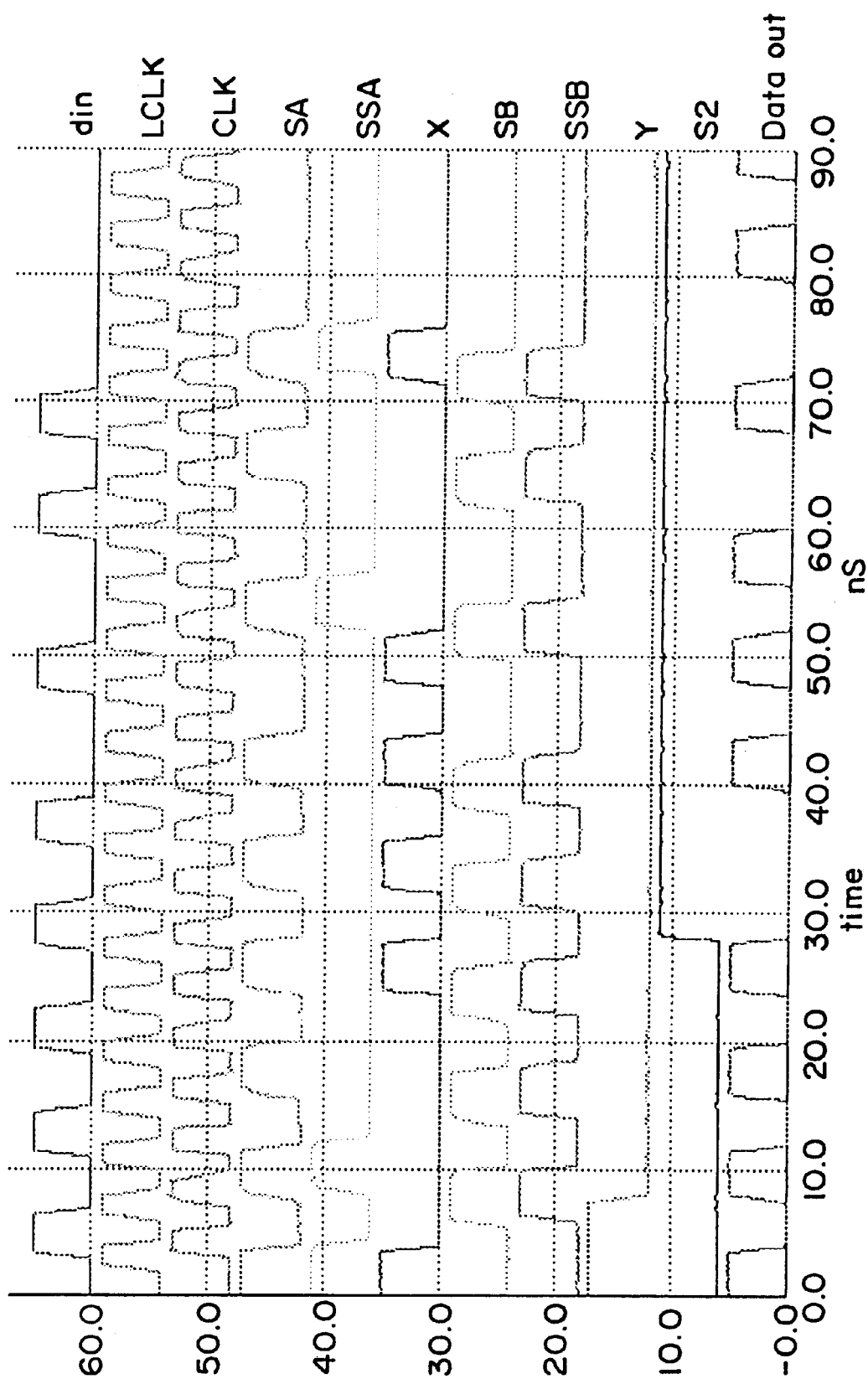
FIG. 10 is a timing diagram generated by a spice-3 simulation of an alternative embodiment of an AMT utilized in an embodiment of the present invention.

A second simulation of the emulated AMT was performed the results of which are presented in FIG. 10. The second simulations provides a test case where the data sampled by the AMT with the clock signal CLKt (sampled signal SSA) contains invalid data. That is, sampled signal SSA is derived from sampling data in its transition state by signal CLKt. The simulation generates this condition by shifting the starting point of the input clock (CLK) by the size of the trap. Consequently, the sampled data (i.e., SSA) is sampled in a series of transition states. When the first invalid sampled data signal is detected by the AMT, S2 is set to high. Thus, the AMT uses the sampled signal SB, i.e., sampled by signal CLKB as its output.

Although only two examples of the meta-stable samples (that is, signals generated by sampling a data bit at its transition state by the CLK or CLKt signals) are shown, similar results occur when the samples derived by signals CLKB or CLKBt are taken at the data bit transition state.

Figure 11:
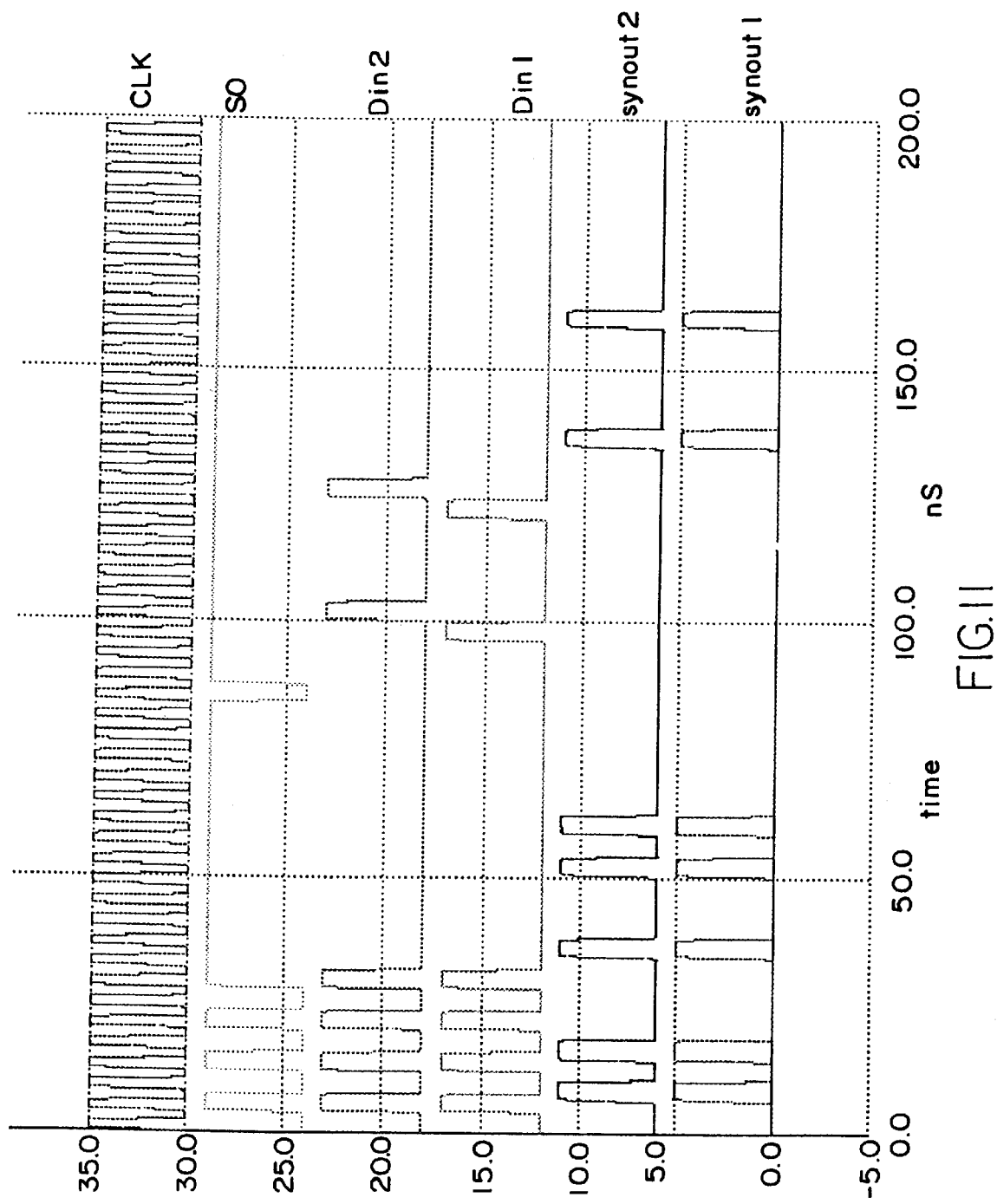
FIG. 11 is a timing diagram generated by a spice-3 simulation of the result of a combination of an AMT and ASC utilized in one embodiment of the present invention.
Figure 12:
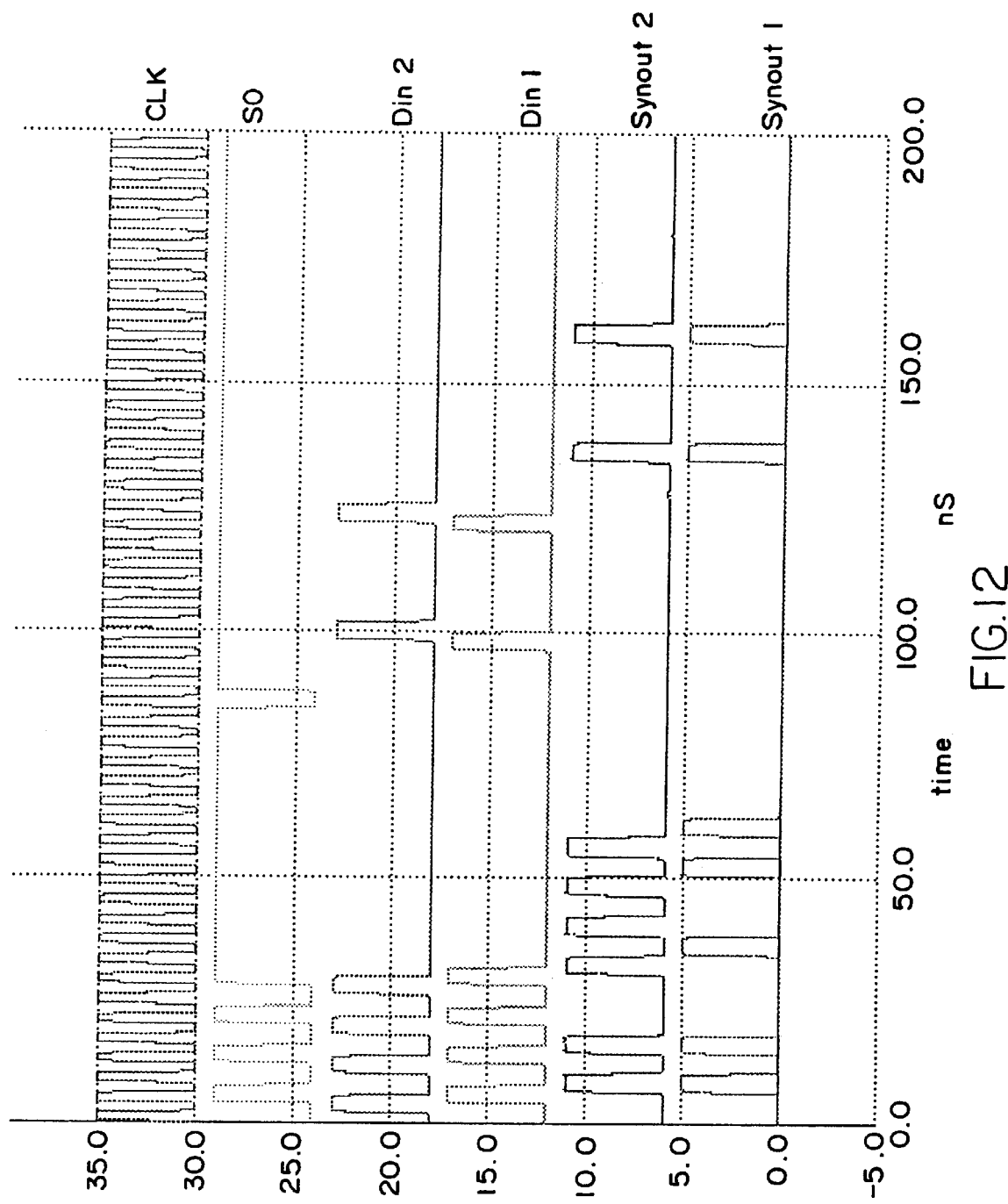
FIG. 12 is a timing diagram generated by a spice-3 simulation of the result of an combination of an AMT and ASC utilized in an alternative embodiment of the present invention.

Simulations of data processing operation of AMT-ASC coordinated operation (switch circuit 100) were also conducted and are highlighted in FIGS. 11 and 12, respectively. A short bit pattern, 010101... is added at beginning of each input signal, e.g., Din 1. Following the Key pattern, one-state bit is provided as the first bit of an ATM cell. The simulations provide that data signals Din1 and Din2 are adjacent and remote inputs, and have a particular delay between the two. That is, the data inputs embody the same bit pattern. The simulations utilize an emulated circuit consisting of only of three AMTs 120 and two ASCs 116 (as distinguished from FIG. 7). The input signals for the simulation are labeled SO, CLK, Din2, and Din1 in FIGS. 11 and 12.

The simulation shown in FIG. 11 highlights a delay between Din1 & Din2 of about 2 ns. And as is shown in the figure, the skewed phase of the two data inputs is adjusted and their delay difference compensated by the ASC circuitry, whereby the outputs of the emulated ASCs (Synout1 & Synout2) are synchronized after a period of about 100 ns.

The simulation shown in FIG. 12 highlights a delay difference of about 4 ns. After both Din1 and Din2 pass through the AMT and the ASC, the output signal Synout2 is bit-aligned to Synout1 after about 100 ns. Hence, the simulated ASCs are found to function in accord with operation of the ASC 116 shown in FIG. 7 (and described in detail above). That is, the simulation results verify the delay compensation function and synchronization ability of the ASC circuits 116.

In summary, the simulated circuit provides for chip-to-chip and/or board-to-board synchronization of cell data at the bit and cell level. The validity of the received data is first verified by its associated AMT 120 on a bit-to-bit basis, and only the sampled data that is valid will be passed to the ASC 116 for further cell-to-cell basis phase alignment. And of course while the data received at each input port is first checked by the AMT during system power up, the inherent drifting nature of the clock and data requires that the validity of the received data be continuously checked by the AMT.

What is claimed is:

1. Anti-meta trap (AMT) circuitry for use with digital data processing circuitry to ensure that digital bit data arriving at the digital data processing circuitry is not sampled at transition state of the bit data, comprising:

an input data port for receiving the digital bit data;

an input clock port for receiving a global signal by which a local clocking signal CLK is generated;

at least four registers electrically coupled to the input data port, the sampling operations of which are each controlled by one of: signal CLK, and sampling signals CLKt, CLKB, and CLKBt;

wherein sampling of each data input bit by signal CLK generates a sampled signal SA, by signal CLKt generates a sampled signal SSA, by signal CLKB generates a sampled signal SB, and by signal CLKBt generates a sampled signal SSB;

at least first and second dual-input exclusive OR circuits, the first dual-input exclusive OR circuit coupled to the outputs of the registers which generated sampling signals SA and SSA, respectively, and the second dual-input exclusive OR circuit coupled to the outputs of the registers which generated sampling signals SB and SSB, respectively; and an SR flip flop, wherein an output port of the first dual-input exclusive OR circuit is coupled to a set input port of the SR flip flop, an output of the second dual-input exclusive OR circuit is coupled to a reset input port of the SR flip flop, such that an output of the SR flip flop controls the selection of an AMT output data signal which is 1) equivalent to sampled signal SA when signal SA is determined to be equivalent to signal SSA, 2) equivalent to sampled signal SB when signal SB is determined to be equivalent to signal SSB and SA is not equal to SSA.

2. Data verification and adjustment circuitry for use with network switching hardware to 1) verify the integrity of cell bit data for processing by the hardware at a bit level, and synchronize a transfer of the verified cell bit data at a cell level before the verified, synchronized cell data is processed by the hardware as a complete data cell, comprising:

a boundary signal input port for receiving a cell boundary reference signal for identifying the data cell boundary of incoming data cells;

a clock input port for receiving a global clock signal generated by the network hardware for data cell transfer, wherein a local clock signal CLK is generated from the global clock signal;

N data input ports;

(N+1) anti-meta trap (AMT) circuits, wherein N AMT circuits are coupled to the N data input ports, respectively, and the (N+1)th AMT is coupled to the boundary signal input port, wherein each AMT circuit verifies that each bit of cell data received at the data input ports and the boundary signal input port is not sampled for use by the hardware at a transition state of same data bit, each AMT circuit comprising:

a) elements for sampling each data bit received at each port by one of: the local CLK signal, 2) a CLKt signal which is a phase shifted version of signal CLK, 3) a signal CLKB which is 180 degrees out of phase with CLK, and 4) a signal CLKBt which is a phase shifted version of signal CLKB;

b) wherein the received data bit sampled by 1) the local CLK signal generates a signal SA, 2) the CLKt signal generated a signal SSA, 3) the CLKB signal generates a signal SB, and 4) the CLKBt generates a signal SSB; and c) logic elements by which the signal SA is provided as the verified data bit output signal when signal SA is determined to be equivalent to signal SSA, and by which signal SB is provided as the verified data bit when signal SB is determined to be equivalent to signal SSB and signal SA is found to not be equal to signal SSA;

N auto-synchronization circuits (ASCs) connected respectively to each of the AMT circuits to receive its verified data bit output signal, wherein each ASC circuit comprises:

a) a data input port coupled to an AMT circuit to receive the verified data output signal from the AMT's logic elements;

b) a signal port for receiving a version of the cell boundary reference signal; and c) an input port for receiving the local CLK signal;

d) a predetermined number of delay circuits for generating delayed versions of the verified data output signal;

e) a predetermined number of dynamic NAND gates for use in comparing delayed versions of the verified data output signal with a key bit position of version of the verified data output signal delayed one clock cycle; and f) a synchronized data output port;

wherein at least two of said N ASCs receive a signal SO, which signal SO identifies and references the start of a cell or frame of digital data, and verified data bit output signals from at least two AMT circuits, and synchronize a transfer of said verified data bit output signals before passing same signals to the network switching hardware.

3. The data verification and adjustment circuitry defined by claim 2, wherein said switching hardware comprises asynchronous transfer mode (ATM) circuitry.

4. The data verification and adjustment circuitry defined by claim 2, wherein each complete cell of verified bit data includes a predetermined key data pattern appended to the cell in order to facilitate said ASC circuit operation.

* * * * *